United States Patent
Weimann

(10) Patent No.: US 9,411,116 B2
(45) Date of Patent: Aug. 9, 2016

(54) CHEMICAL COMPOSITION OF FILLER RODS FOR USE IN OPTICAL FIBER CABLES

(71) Applicant: OFS Fitel, LLC, Norcross, GA (US)

(72) Inventor: Peter A Weimann, Atlanta, GA (US)

(73) Assignee: OFS FITEL, LLC, Norcross, GA (US)

( * ) Notice: Subject to any disclaimer, the term of this patent is extended or adjusted under 35 U.S.C. 154(b) by 325 days.

(21) Appl. No.: 14/011,292

(22) Filed: Aug. 27, 2013

(65) Prior Publication Data

US 2014/0064683 A1 Mar. 6, 2014

Related U.S. Application Data

(60) Provisional application No. 61/694,433, filed on Aug. 29, 2012, provisional application No. 61/790,683, filed on Mar. 15, 2013.

(51) Int. Cl.
*G02B 6/44* (2006.01)

(52) U.S. Cl.
CPC .............. *G02B 6/4436* (2013.01); *G02B 6/441* (2013.01); *G02B 6/4479* (2013.01); *G02B 6/4483* (2013.01)

(58) Field of Classification Search
CPC ..... G02B 6/441; G02B 6/4429; G02B 6/4436
See application file for complete search history.

(56) References Cited

U.S. PATENT DOCUMENTS

| 5,808,239 | A | * | 9/1998 | Olsson | H01B 7/1895 174/113 C |
|---|---|---|---|---|---|
| 6,066,397 | A | | 5/2000 | Risch et al. | |
| 6,210,802 | B1 | | 4/2001 | Risch et al. | |
| 6,411,403 | B1 | * | 6/2002 | Siddhamalli | G02B 6/443 385/109 |
| 7,272,282 | B1 | * | 9/2007 | Seddon | G02B 6/4475 385/100 |
| 8,041,167 | B2 | * | 10/2011 | Overton | C03C 25/106 385/100 |
| 2006/0045439 | A1 | * | 3/2006 | Brown | G02B 6/443 385/100 |
| 2009/0003780 | A1 | * | 1/2009 | Bringuier | G02B 6/4494 385/113 |

OTHER PUBLICATIONS

Introduction to Polypropylene, Equistar Technical Tip tech.topic.

* cited by examiner

*Primary Examiner* — Daniel Petkovsek

(57) ABSTRACT

The present disclosure provides optical fiber cable having one or more filler rods. The filler rods have higher melting temperature than conventional filler rods. For some embodiments, the filler rods are made from a blend of polyethylene and polypropylene.

12 Claims, 2 Drawing Sheets

CHEMICAL COMPOSITION OF FILLER RODS FOR USE IN OPTICAL FIBER CABLES

CROSS REFERENCE TO RELATED APPLICATIONS

This application claims the benefit of U.S. provisional patent application Ser. No. 61/694,433, filed Aug. 29, 2012 having the title "Foamed Filler Rods using HDPE/PP Blends," which is incorporated herein by reference in its entirety. This application also claims the benefit of U.S. provisional patent application Ser. No. 61/790,683, filed Mar. 15, 2013 having the title "Foamed Filler Rods using Polyethylene (PE) and Polypropeen (PP) Blends," which is incorporated herein by reference in its entirety.

BACKGROUND

1. Field of the Disclosure

The present invention relates to optical fiber cables. More particularly, the present invention relates to filler rods for the optical fiber cables.

2. Description of Related Art

A loose tube optical fiber cable generally consists of five or more polymeric "buffer tubes" containing between 2 and 144 glass optical fibers twisted around a central strength member. The central member typically consists of either a fiberglass/epoxy composite rod or a steel wire. The central strength member may be beneficially jacketed with a polymeric material to reach the proper size. The cable core is then encased in a protective outer polymeric jacket which is formed by profile extrusion. Other reinforcing or protective materials, such as reinforcing yarns or waterblocking materials, may be included under the outer polymeric jacket.

Packaging the fibers in multiple individual buffer tubes allows end-users to conveniently handle individual tubes during installation, allowing them to only access the fibers needed without disturbing the relatively fragile glass fibers in the other tubes. Using a minimum of five 'positions' for the tubes within the cable ensures that the finished cable has a substantially round shape, which is beneficial in spooling, unspooling and installing the optical cable.

There are situations where the end-user desires the benefits of loose tube structure, but requires a relatively low number of optical fibers. An example would be an end user specifying 24 or 48 optical fibers organized into 12 fiber tubes. Typically, when such a reduced count loose tube cable is made, one or more of buffer tubes inside the cable are replaced by filler rods to fill the five positions and maintain a substantially round structure in the finished cable. In many common cable structures, extruded outer jackets are directly applied over the subunit tubes and filler rods. In this process, problems can arise when parts of the filler rods melt and become intermingled with or adhere to the molten cable jacket material during manufacturing. Consequently, there are ongoing efforts to improve the filler rods.

SUMMARY

The present disclosure provides filler rods that have higher melting temperature than the conventional filler rods and methods of making the filler rods. For some embodiments, the filler rod is made a blend of polyethylene and polypropylene. Other materials, devices, methods, features, and advantages will be or become apparent to one with skill in the art upon examination of the following drawings and detailed description. It is intended that all such additional materials, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
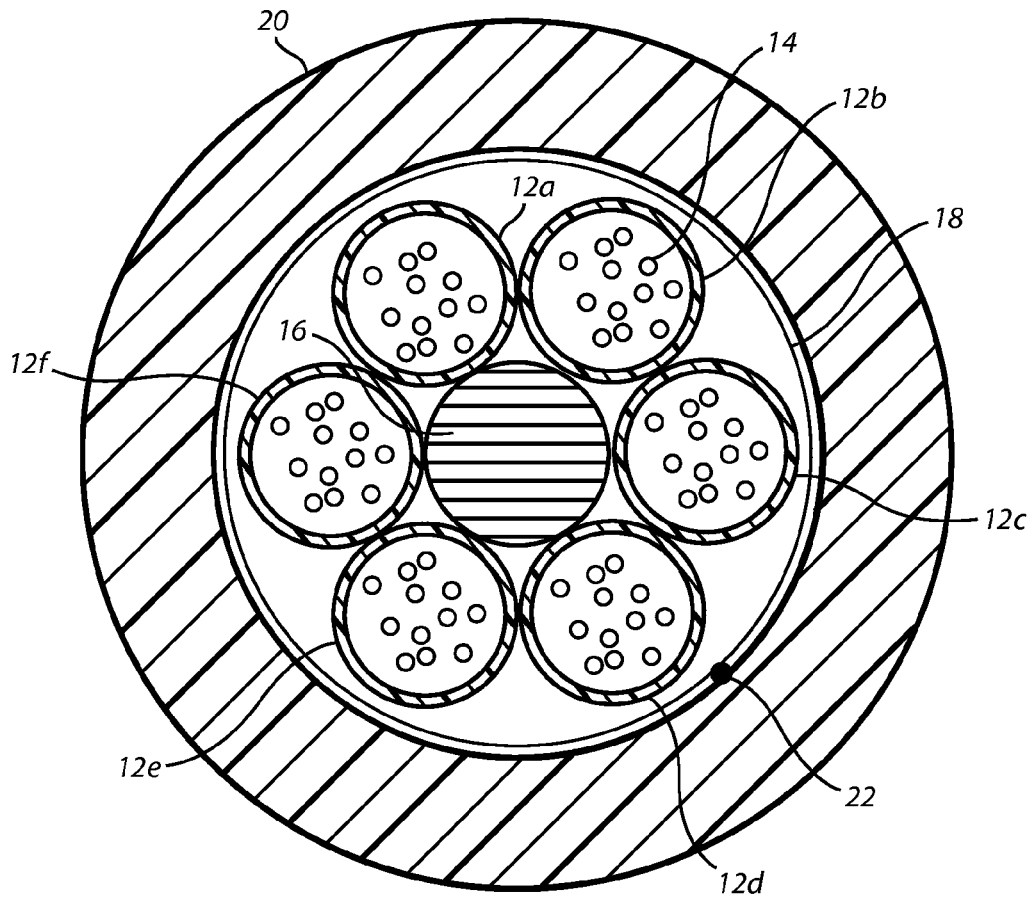
FIG. 1 is a cross-sectional schematic diagram showing a typical stranded loose tube optical fiber cable.

Optical fiber cables have been used for many years to transmit information at very high rates over long distance. One type of the optical fiber cables commonly used is a loose tube cable. The loose tube cable has a plurality of buffer tubes stranded in a helical or alternating helical arrangement about a central strength member as a cable core which is typically substantially round and symmetric, generally with a minimum of five buffer tubes. Each of the buffer tubes typically contains up to 12 optical fibers or more, or in some cases ribbons incorporating multiple optical fibers. Then, a protective cable jacket is usually extruded over the cable core to make a loose tube cable. Other strength members such as aramid yarns, ripcords and water blocking members can be included in the loose tube cable.

In some loose tube cable applications, it is desirable to have a lower fiber count in a standard configuration cable having the same symmetrical construction. When a reduced fiber count cable is made, normally one or more of the buffer tubes are replaced by one or more filler rods. The filler rods fill the space that would normally be occupied by a buffer tube containing optical fibers so as to keep the substantially round structure of the cable intact. The filler rod also permits the manufacturing process for making such loose tube cables to remain substantially unchanged, whether making a low or high fiber count optical fiber cable.

Filler rods are included in the cable to simply occupy space and help maintain a round cable shape, and are typically fabricated out of inexpensive material, typically high-density polyethylene (HDPE). However, the material used for the filler rods usually has a relatively low melting temperature compared to other materials used in other components of the loose tube cable, such as the polypropylene and poly(butylene terephthalate) materials typically used for buffer tubes. Because of the relatively low melting temperature of the filler rods, when a molten cable jacket is applied to the cable core during manufacturing, parts of the filler rods can melt and adhere to the molten cable jacket. Such adhesion between the filler rods and the cable jacket is undesirable because it affects the usability of the cable in the field. End users must remove the jacket to access the fiber tubes when splicing a cable to other cables, or accessing tubes in the middle of a cable run to "drop" fibers to individual subscribers. If the jacket is adhered to the filler rods, it is difficult or impossible to cleanly remove the cable jacket during cable termination in the field. Difficulty in removing the jacket can also result in accidental kinking of or damage to the buffer tubes containing fibers, potentially causing signal loss or fiber breaks.

The disclosed filler rods and methods of making the same provide approaches to mitigating or eliminate adhesion between the filler rods and the cable jacket by changing the materials used for the filler rods, thereby changing the melting behavior of the filler rods. Consequently, each filler rod can sustain its shape when a molten cable jacket is applied. This results in preventing parts of the filler rods from melting and adhering to the molten cable jacket. Therefore, the cable can maintain the ease of jacket removal during cable termination in the field.

Having provided an overview of the filler rods for avoiding adhesion between the filler rods and the cable jacket, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 is a diagram showing a typical stranded loose tube optical fiber cable. The cable 10 has a cable core comprised of a plurality of buffer tubes 12a-12f, each of which house optical fibers 14, stranded about a central strength member 16. A core wrap 18 may positioned over the cable core. Water blocking materials (not shown) or fire retardant materials (not shown) may be disposed in the cable core, if desired. A protective cable jacket 20 is disposed over the cable core and a ripcord 22 is provided near the interface of the wrap 18 and the cable jacket 20. The loose tube cable 10 illustrated in FIG. 1 has a maximum fiber count of 72 fibers.

Figure 2:
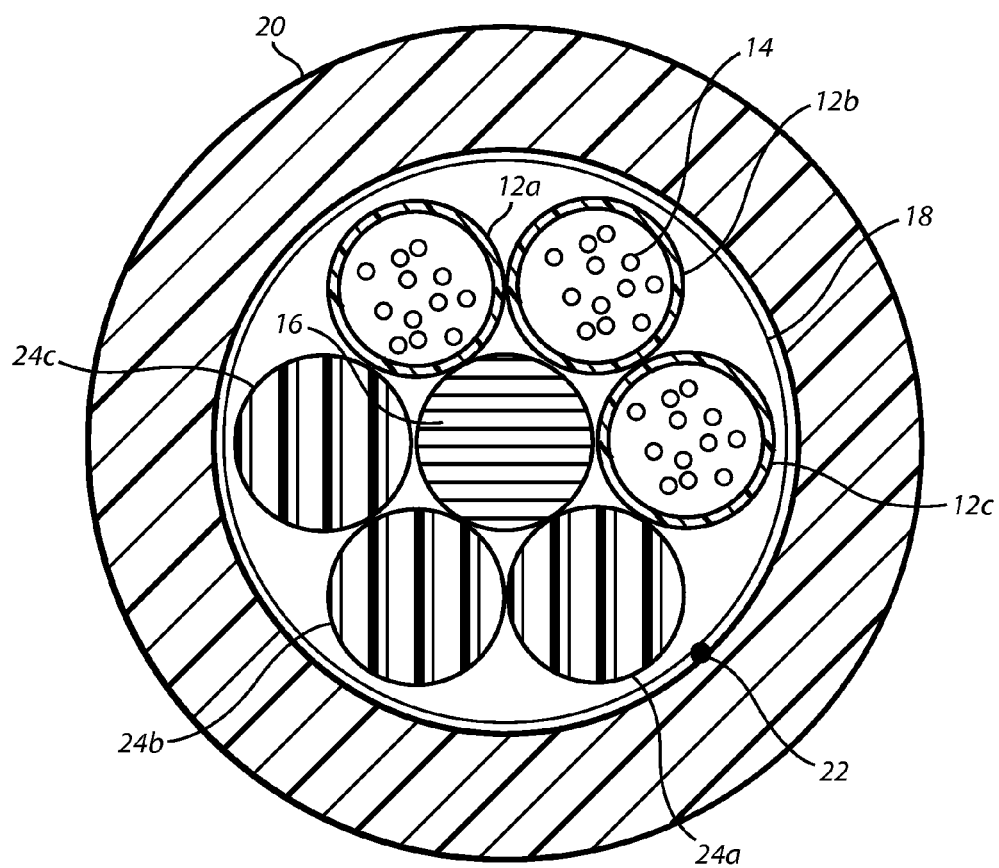
FIG. 2 is a cross-sectional schematic diagram showing a loose tube optical fiber cable similar in structure to the cable shown in FIG. 1 wherein some of the buffer tubes have been replaced by filler rods.

Referring to FIG. 2, when a cable 11 having a fiber count lower than 72 fibers, for example, is desired, such as 36, some of the buffer tubes (12d-12f) are replaced by filler rods 24a-24c. These filler rods help to ensure that the overall substantially round concentric structure and material properties of the lower fiber count stranded optical fiber cable are essentially same as the higher fiber count cable.

According to the present invention, filler rods (24a-24c) extruded from a blend of polyethylene (PE) with polypropylene (PP) have a higher ultimate melting temperature than conventional filler rods extruded from pure high density polyethylene (HDPE) resin. Higher melting temperature of the filler rods is an important factor in increasing manufacturing efficiency. The filler rods can directly contact the molten cable jacket during cable manufacturing without melting or deforming. The cable jacket is formed by profile extrusion and undergoes shear heating when it is melted, homogenized and pumped in an extruder. Increasing production linespeed requires an increased flow rate of jacketing material through the extruder, resulting in increased shear heating and a resulting increase in the temperature of the molten jacket. Filler rods with a higher ultimate melting temperature are more resistant to increased melting temperature, supporting increased process speeds. Under typical high speed cable jacketing conditions, on the order of 100 to 120 meters per minute, the filler rods made from the above PE/PP blend (Sample Embodiments 1 and 2) did not stick to the cable jacket, unlike the conventional filler rods made from the HDPE material (Comparative Examples 1 and 2) as shown in Table I below.

TABLE I

| Samples | Fiber Count | Cable configuration | Line speed (mpm) | Temperature of the molten outer jacket (° C.) | Result |
| --- | --- | --- | --- | --- | --- |
| Sample Embodiment 1 | 12 | one 2.5 mm polypropylene tube + four 50/50, PP/HDPE 2.5 mm filler rods | 100 | 186-194 | No bonding between jacket and filler rods |
| Sample Embodiment 2 | 12 | one 2.5 mm polypropylene tube + four 50/50, PP/HDPE 2.5 mm filler rods | 120 | 194-199 | No bonding between jacket and filler rods |
| Conventional Example 1 | 12 | one 2.5 mm polypropylene tube and four 2.5 mm HDPE filler rods | 100 | 186-194 | Jacket can be removed with difficulty, rods are damaged |
| Conventional Example 2 | 12 | one 2.5 mm polypropylene tube and four 2.5 mm HDPE filler rods | 120 | 194-199 | Jacket can't be removed due to severe bonding |

The disclosed filler rod is an elongated rod comprising of a blend of polyethylene (PE) and polypropylene (PP), and the blend is thermodynamically unstable. Unlike copolymers of PP and PE, where the copolymer is formed by covalent bonding between dissimilar monomers or polymer chains, the disclosed filler rod is made from a mechanical mix of PP and PE. Molten polyethylene and polypropylene are immiscible, meaning that they will not form a uniform, homogeneous mixture when blended. As such, the blended rods are thermodynamically unstable. If the blended material were held in the melt state without being mechanically mixed, it would phase separate into the individual components.

A copolymer is defined and understood by those skilled in the art as "a product of copolymerization of two different monomers." For example, impact modified polyethylene-polypropylene copolymer (impact modified PP) is formed by first polymerizing PP homopolymer, then copolymerizing ethylene and propylene comonomers to form an ethylene-propylene rubber (EPR) phase. In an impact-modified copolymer, chains of EPR material are covalently bonded onto chains of PP homopolymer. Although the EPR chains phase-separate from the PP homopolymer in the melt state, the components of an impact-modified PP copolymer cannot be separated unless covalent bonds between the components are separated.

On the other hand, the disclosed filler rod is made of a blend of two distinct polymers, PE and PP, that are not covalently bonded together. A polymer blend is defined as a "macroscopically homogenous mixture of two or more different species of polymer" according to INTERNATIONAL UNION OF PURE AND APPLIED CHEMISTRY (IUPAC). Because the polymer blend is formed by mechanically mixing different polymers which are immiscible in the melt state, the blend is thermodynamically unstable. After mechanical mixing of the two materials in an extruder, the material is formed into a rod but passing through a die, then immediately quenched in cool water. This quenching freezes the blend material, trapping it in a solid, metastable state. The frozen rod is not in its lowest-energy state, but it has insufficient thermal energy to phase-separate into its individual components.

Compared to pure polymers, blends of immiscible polymers can have reduced tensile strength and/or impact strength, as the interfaces between the two phases are weak. Impact-modified copolymers are polymerized such that they will contain covalent bonds across the two separated phases, and therefore have enhanced impact strength compared to a blend. Although the PE-PP blend may have relatively low impact resistance, it is sufficiently stable for the filler rod application. These rods are not structural, they are spacers which do not contribute to the mechanical characteristics of the finished cable. The polymer blend is advantageous over copolymer for the filler rod application because the properties of the filler rods can be adjusted quickly and easily by changing the ratio of polymers just before the polymers are mechanically mixed and extruded as a filler rod.

Also, cost reduction of the filler rod is also an important aspect of the disclosed filler rods because the filler rods do not contribute to the value of the resulting cable. The filler rods do not add any value because they merely fill in empty space to keep the structure of the cable intact. Therefore, the cost of the filler rods must be as low as possible while preventing the filler rods adhere to the molten cable jacket.

PP homopolymers, such as isotactic or syndiotactic PP, are generally not acceptable for use in filler rods. PP homopolymers generally have a glass transition temperature of $-5°$ C. to $0°$ C. and crack very easily at temperatures below this range. Typical outside plant optical cables must perform at temperatures as low as $-40°$ C. Unmodified homopolymer PP can turn glassy and crack easily in these conditions.

Impact-modified PP copolymers address this concern by increasing resistance to cracking at low temperatures. However, these materials are not desirable for use in filler rods, because copolymer suitable for the filler rods is more expensive than the proposed polymer blends suitable for the filler rods. An impact modified PP copolymer is made in two steps: by first polymerizing PP homopolymer, then copolymerizing ethylene and propylene comonomers to form an EPR phase. Because the EPR can't mix with the PP in the solid state, the EPR forms rubbery inclusions in the PP that absorb cracks and prevents fracture at low temperatures. However, the multiple processes involving in making copolymer suitable for a filler rod add to the material cost.

On the other hand, using a polymer blend of PE and PP allows sourcing of any convenient crystalline PP, including isotactic PP. Blending with PE, which has a glass transition temperature of approximately $-77°$ C., is sufficient to limit cracking at low temperatures. Mechanical mixing of the two blend components is easily accomplished during the extrusion of the filler rod, which must occur regardless of which materials of construction are used. Although the PP and PE blend is not thermodynamically stable, the mixture can be frozen into a metastable state by quenching in a water bath after extrusion. Therefore, a polymer blend suitable for the filler rods is more economical than copolymer suitable for the filler rods.

Also, the ease of adjusting the mix of PE/PP blend further optimizes the cost reduction for a specific cable design and manufacturing line speed. PE is cheaper than PP; however, PE has lower melting temperature compared to PP. PP is more expensive than PE; however, PP has higher melting temperature compared to PE. By mixing the two, the ultimate melting behavior and temperature resistance of the PP/PE blend can be varied depending on the demands of the cable manufacturing process. The temperature of the molten cable jacket that is applied to the filler rods during manufacturing increases as manufacturing line speed increases. Furthermore, the temperature of the molten outer jacket also depends on the factors such as the type of cable and the specific grade of cable jacket material used. Because the PE/PP blended filler rods only need to sustain their shapes (and therefore, do not adhere to the cable jacket) under the highest temperature exposed by the molten cable jacket, the PE/PP blended filler rods can be tailor made for a specific cable at a specific line speed by changing the ratio of PE and PP during extrusion of the blend to make filler rods. Although the PE/PP blended filler rods are beneficial for any cables requiring one or more filler rods, the PE/PP blended filler rods are extremely useful when temperature of the molten cable jacket is approximately between $185°$ C. and $220°$ C. and the filler rod is directly in contact with the molten cable jacket, because such temperature far exceeds the melting temperature of the conventional HDPE filler rods. The loose tube cables that use the PE/PP blended filler rods do not contain any barrier tapes that prevents direct contact between the filler rods and the cable jacket, because such barrier tape adds cost and reduces manufacturing efficiency by adding an additional complexity. Therefore, such ease of adjusting the mix of PE/PP blend further optimizes the cost reduction.

The ratio of PE and PP in the disclosed filler rods can be adjusted depending on factors such as the type of cable, material for the cable jacket, manufacturing line speed, and interest in enhancing other property of the filler rods. In some embodiments, the filler rod contains at least 20% of the PE. Preferably, the filler rod contains at least 50% of the PE.

The types of PE and PP can be adjusted depending on factors described above. In some embodiments, PE can be high density polyethylene (HDPE), linear low-density polyethylene (LLDPE), low-density polyethylene (LDPE) or medium density polyethylene (MDPE). Also, in some embodiments, the PP can be an impact-modified PP copolymer or unmodified PP.

Optionally, the filler rods can be foamed by chemical or physical foaming agents. The foamed filler rods can further reduce the cost of the filler rods by reducing the mass of material used for the filler rods.

Furthermore, the PE/PP blended filler rods have lower post extrusion shrinkage comparing to the conventional HDPE filler rods as shown in Table II. The Table II compares shrinkage of the PE/PP blended filler rod and a conventional HDPE filler rod when heated at $85°$ C. for 7 days. It is desirable that filler rods for optical fiber cables undergo a minimum amount of shrinkage during lifetime of the cable because the lower shrinkage of the filler rods will reduce stress on the "live" fibers in buffered tubes in the cable when exposed to high temperatures including aerial installation. Also, excessive post extrusion shrinkage of filler rods within a cable reduces crush resistance of the cable, especially in low fiber count cables with many filler rods. In some embodiments, post extrusion shrinkage of the filler rod is less than approximately 2%.

TABLE II

| 2.5 mm filler rod | Original length (mm) | Final Length (mm) | Shrinkage (%) |
|---|---|---|---|
| PP/HDPE Blended Filler Rod | | | |
| 075-58-Table 1 | No spec | No spec | No Spec |
| Test 1 | 150.4 | 148.6 | 1.8 |
| Test 2 | 150.7 | 148.9 | 1.8 |
| Test 3 | 151.1 | 149 | 2.1 |
| Test 4 | 150.7 | 148.8 | 1.9 |
| Test 5 | 150.6 | 148.9 | 1.7 |
| Sample Avg. | 150.7 | 148.84 | 1.86 |
| Conventional HDPE Filler Rod | | | |
| 075-58-Table 1 | No spec | No spec | No Spec |
| Test 1 | 151.9 | 1.49.3 | 2.6 |
| Test 2 | 152.4 | 150 | 2.4 |
| Test 3 | 147.3 | 145.1 | 2.2 |
| Test 4 | 148.1 | 145.6 | 2.5 |
| Test 5 | 141.8 | 139.4 | 2.4 |
| Sample Avg. | 148.29 | 145.88 | 2.42 |

Furthermore, because the filler rods fill the space that would normally be occupied by a buffer tube, a cross sectional area of the filler rod is approximately the same as a cross sectional area of one or more buffer tubes for the optical fiber cable.

Although exemplary embodiments have been shown and described, it will be clear to those of ordinary skill in the art that a number of changes, modifications, or alterations to the disclosure as described may be made. For example, it should be appreciated that the original optical fiber cable configuration may contain less than six loose tubes or more than six loose tubes, and the filler rods may replace any of the loose tubes at any location within the cable. In some embodiments, the optical fibers within a tube maybe fewer than 12 fibers or more than 12 fibers.

Yet other embodiments include a method for manufacturing a filler rod, where the materials of the filler rod, PE and PP, are blended and extruded to an elongated rod. The PE and PP blends are not copolymerized or compatibilized, and the blend of PE and PP is thermodynamically unstable. However, because the blend of PE and PP are well mixed just before those materials are extruded to make a filler rod then frozen in a metastable state, the blend of PE and PP creates a filler rod that is sufficiently stable under the normal operational condition of the cable that contains the filler rods.

For still other embodiments, before the extrusion of the filler rod, the maximum temperature of a molten cable jacket that the filler rod will be directly in contact with during cable manufacturing is determined, then the amount of PP in the mixture is adjusted accordingly so that the filler rod does not adhere to the molten cable jacket when the filler rod is covered by the molten cable jacket. Because the PE/PP blended filler rods only need to sustain their shape (therefore do not adhere to the cable jacket) under the highest temperature exposed by the molten outer jacket, the PE/PP blended filler rods can be tailor made for a specific cable for a specific line speed by changing the ratio of PE and PP just before blending the two materials and extrude the blend to make filler rods.

In other embodiments, the filler rod is foamed during the extrusion through chemical or physical foaming. The foamed filler rods can further reduce the cost of the filler rods by reducing the mass of material used for the filler rods.

Although exemplary embodiments have been shown and described, it will be clear to those of ordinary skill in the art that a number of changes, modifications, or alterations to the disclosure as described may be made.

What is claimed is:

1. An optical fiber cable comprising:
an elongated buffer tube;
an optical fiber in the buffer tube;
an elongated filler rod comprising:
a blend of polyethylene (PE) and polypropylene (PP) wherein the blend is thermodynamically unstable; and
a cable jacket covering the buffer tube and the filler rod.

2. The optical fiber cable of claim 1, wherein the PE comprises at least 20 wt. % of the filler rod.

3. The optical fiber cable of claim 2, wherein the PE comprises at least 50 wt. % of the filler rod.

4. The optical fiber cable of claim 1, wherein the PE is high density polyethylene (HDPE), linear low-density polyethylene (LLDPE), low-density polyethylene (LDPE) or medium density polyethylene (HDPE).

5. The optical fiber cable of claim 1, wherein the PP is an impact-modified PP copolymer or unmodified PP.

6. The optical fiber cable of claim 1, wherein the PE and PP in the blend are not covalently bonded to each other.

7. The optical fiber cable of claim 1, wherein the blend is a macroscopically homogenous mixture of the PE and PP.

8. The optical fiber cable of claim 1, wherein the filler rod is a foamed filler rod.

9. The optical fiber cable of claim 1, wherein the filler rod does not adhere to a molten cable jacket when the filler rod is covered by the molten cable jacket.

10. The optical fiber cable of claim 9, wherein temperature of the molten cable jacket is approximately between 185° C. and 220° C. when the filler rod is directly in contact with the molten cable jacket.

11. The optical fiber cable of claim 1, wherein the filler rod sustains its shape when the filler rod is covered by a molten cable jacket.

12. The optical fiber cable of claim 1, wherein a cross sectional area of the filler rod is approximately the same as a cross sectional area of the buffer tube.

\* \* \* \* \*